United States Patent [19]

Tanaka

[11] Patent Number: 4,727,273
[45] Date of Patent: Feb. 23, 1988

[54] PERMANENT MAGNET TYPE ELECTRIC MOTOR

[75] Inventor: Toshinori Tanaka, Himeji, Japan

[73] Assignee: Mitsubishi Denki Kabushiki Kaisha, Tokyo, Japan

[21] Appl. No.: 32,215

[22] Filed: Mar. 31, 1987

[30] Foreign Application Priority Data

Apr. 4, 1986 [JP] Japan ................................. 61-51202

[51] Int. Cl.⁴ .......................................... H02K 21/12
[52] U.S. Cl. .................................................. 310/154
[58] Field of Search ............... 310/152, 154, 181, 258, 310/254, 191, 40 MM

[56] References Cited

U.S. PATENT DOCUMENTS

| | | | |
|---|---|---|---|
| 3,594,599 | 7/1971 | West | 310/258 |
| 3,663,851 | 5/1972 | Persson | 310/154 |
| 3,939,371 | 2/1976 | Murakami | 310/154 |
| 4,110,718 | 8/1978 | Odor | 310/154 X |
| 4,112,320 | 9/1978 | Mohr | 310/154 |
| 4,151,435 | 4/1979 | Jandeska | 310/154 |
| 4,155,021 | 5/1979 | Corbach | 310/154 |
| 4,237,397 | 12/1980 | Mohr | 310/154 |
| 4,383,193 | 5/1983 | Tomite | 310/154 |
| 4,445,059 | 4/1984 | Corbach | 310/154 |
| 4,467,232 | 8/1984 | Eichhorn | 310/154 |
| 4,469,969 | 9/1984 | Tomite | 310/154 |
| 4,574,214 | 3/1986 | Fujisaki | 310/154 |
| 4,639,625 | 1/1987 | Abukawa | 310/154 |
| 4,687,608 | 8/1987 | Eino | 310/154 X |

Primary Examiner—Donovan F. Duggan
Attorney, Agent, or Firm—Sughrue, Mion, Zinn, Macpeak and Seas

[57] ABSTRACT

A permanent magnet type electric motor including a cylindrical yoke, a plurality of magnetic poles arranged peripherally on an inner surface of the yoke and an armature arranged rotatably in a region surrounded by the magnetic poles is featured by the magnetic poles each composed of a rare earth metal containing magnet, a ferrite magnet and an auxiliary magnetic pole of a high permeability material all of which are juxtaposed in the order and satisfy axial length relations of (ferrite magnet)>(auxiliary pole)≧(rare earth metal containing magnet) and (ferrite magnet)>(armature core).

3 Claims, 2 Drawing Figures

4,727,273

PERMANENT MAGNET TYPE ELECTRIC MOTOR

BACKGROUND OF THE INVENTION

The present invention relates to a permanent magnet type electric motor including a stator having a plurality of field magnetic poles each having a composite permanent magnet composed of a rare earth metal containing permanent magnet and a ferrite magnet and an auxiliary pole and, particularly, to an improvement of the field magnetic poles.

A permanent magnet type electric motor having a cylindrical yoke on an inner peripheral surface of which field magnetic poles each composed of a ferrite magnet and a rare earth metal containing permanent magnet are arranged is known in, for example, Japanese Utility Model Application Laid-Open No. 18642/1985. In such motor, it is in general that an axial length of the ferrite magnet is equal to that of the rare earth metal containing magnet. Since the residual magnetic flux density Br of the ferrite magnet is 4500 gausses at most even when it is formed of a high Br material, magnetic flux from a surface of the rare earth metal containing magnet, when it is juxtaposed with the ferrite magnet, loops toward the ferrite magnet and a flux density distribution in a magnetic pole surface tends to become non-uniform. As a result, there may be the so-called cogging due to the nonuniformity of flux density in the magnetic pole surface and a reduction of effective flux due to the flux looping. Further, since the rare earth metal is expensive, it is highly desired to reduce an amount of such material as small as possible, which may contribute to a reduction of weight of a resultant motor.

SUMMARY OF THE INVENTION

An object of the present invention is to provide a permanent magnet type electric motor which includes a plurality of field magnetic poles each composed of a composite magnet including a ferrite magnet and a rare earth metal containing magnet and an auxiliary magnetic pole of high permeability material and in which a flux density in a magnetic pole surface is uniform and effect of flux looping from the rare earth metal containing magnet to the ferrite magnet is minimized.

The motor according to the present invention comprises a cylindrical yoke, a plurality of field magnetic poles each composed of a composite magnet including a ferrite magnet and a rare earth metal containing magnet arranged on a flux reducing side on which an armature reaction flux acts and a center ferrite magnet and an auxiliary magnetic pole formed of a high permeability material and arranged on a flux increasing side, the field magnetic poles being arranged peripherally on an inner surface of the cylindrical yoke, and an armature core provided rotatably within a region surrounded by the magnetic poles and is characterized by that an axial length of the ferrite magnet is longer than that of the auxiliary magnetic pole which is equal to or longer than that of the rare earth metal containing magnet.

In the permanent magnet type electric motor according to the present invention, when the armature is energized by a d.c. power source, a rotational force is produced for the armature due to an energizing magnetic force given by the field magnetic poles. In such case, there is little flux looping occurred in a portion of the ferrite magnet which protrudes from the rare earth metal containing magnet and, since an area of the magnetic pole of the ferrite magnet is larger than that of the rare earth metal containing magnet, the flux density of the ferrite magnet pole is increased.

BRIEF DESCRIPTION OF THE ACCOMPANYING DRAWING

FIG. 1 is a cross section of an embodiment of the permanent magnet type electric motor according to the present invention, showing an arrangement of a yoke and magnetic poles; and FIG. 2 is a perspective view of the magnetic pole shown in FIG. 1.

DETAILED DESCRIPTION OF THE PREFERRED EMBODIMENT

Figure 1:
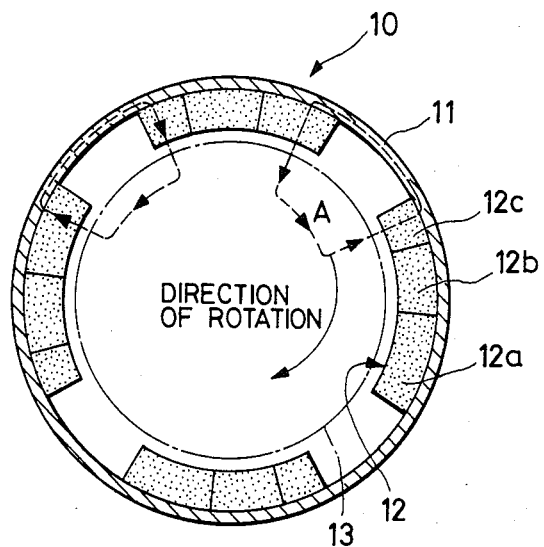
Figure 2:
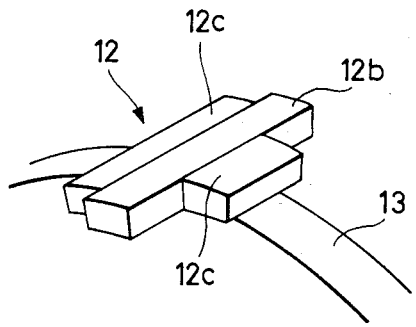

In FIG. 1, a permanent magnet type electric motor 10 which is an embodiment of the present invention includes a cylindrical yoke 11, a plurality of field magnetic poles 12 each composed of a composite permanent magnets and an armature core 13 provided rotatably in a region defined by the field magnetic poles 12. The field magnetic poles 12 are arranged peripherally on an inner surface of the cylindrical yoke 11 as shown.

Each field magnetic pole 12 includes a rare earth metal containing magnet 12a disposed in a demagnetizing side on which an armature reaction flux acts, a center ferrite magnet 12b and an auxiliary magnetic pole 12c formed of a high permeability material and arranged in a magnetizing side. The rare earth metal containing magnet 12a, the ferrite magnet 12b and the high permeable magnetic pole 12c which constitute each magnetic pole piece of the field magnetic pole 12 have axial lengthes satisfying a condition of (ferrite magnet 12b) > (auxiliary pole 12c) ≧ (rare earth metal containing magnet 12a).

Further, the length of the ferrite magnet 12b is longer than the axial length of the armature core 13.

In operation, when the armature is energized by a d.c. power source which is not shown, the armature is subjected to a magnetizing force produced by the field magnetic poles 12 and rotated by a rotational force produced thereby. In such situation, a portion of the ferrite magnet 12b which protrudes from the rare earth metal containing magnet 12a is little influenced by the looping phenomenon of flux. Further, since an area of the magnetic pole of the ferrite magnet 12b is larger than the rare earth metal containing magnet 12a, the flux density in an air gap between the ferrite magnet 12b and the armature 13 can be increased.

The axial length of the auxiliary pole 12c is preferably larger than that of the rare earth metal containing magnet 12a to reduce a magnetic resistance of a magnetic circuit A shown by a dotted line in FIG. 1.

In order to reduce an amount of the rare earth metal containing magnet material, it is preferable to shorten the axial length of the rare earth metal containing magnet 12a comparing with the armature core 13. Further, in order to facilitate a positioning of bonding of the magnetic poles 12 to the yoke 11, it is preferable to bond the rare earth metal containing magnet 12a to the ferrite magnet 12b with an aid of a suitable adhesive to form a subassembly and then to bond the subassembly to the yoke 11.

As mentioned hereinbefore, according to the permanent magnet type electric motor of the present invention, it is possible to uniformize the flux density in the magnetic pole surface and to minimize the effect of flux looping from the rare earth metal containing magnet to the ferrite magnet. Therefore, the problem of cogging is removed and thus it is possible to improve the performance of the motor. Furthermore, since the amount of the rare earth metal containing magnet material can be reduced, both the cost and weight of the motor are reduced.

What is claimed is:

1. A permanent magnet type electric motor, comprising a cylindrical yoke, a plurality of field magnetic poles arranged peripherally on an inner surface of said cylindrical yoke, each of said field magnetic poles being composed of a composite permanent magnet formed by a rare earth metal-containing permanent magnet arranged on a flux reducing side on which armature reaction flux acts and a center ferrite magnet and an auxiliary pole formed of a high permeability material arranged on a flux increasing side, and an armature core provided rotatably within a region surrounded by said composite magnetic poles, an axial length of said auxiliary pole being shorter than an axial length of said ferrite magnet and equal to or longer than an axial length of said rare earth metal containing permanent magnet.

2. The permanent magnet type electric motor as claimed in claim 1, wherein the axial length of said rare earth metal containing permanent magnet is shorter than an axial length of said armature core.

3. The permanent magnet type electric motor as claimed in claim 1, wherein said ferrite magnet and said rare earth metal containing permanent magnet are bonded togther preliminarily with an adhesive and are then fixedly mounted on said inner surface of said cylindrical yoke.

* * * * *